J. GARDNER.
Making Confectionery.
No. 85,083.
Patented Dec. 22, 1868.
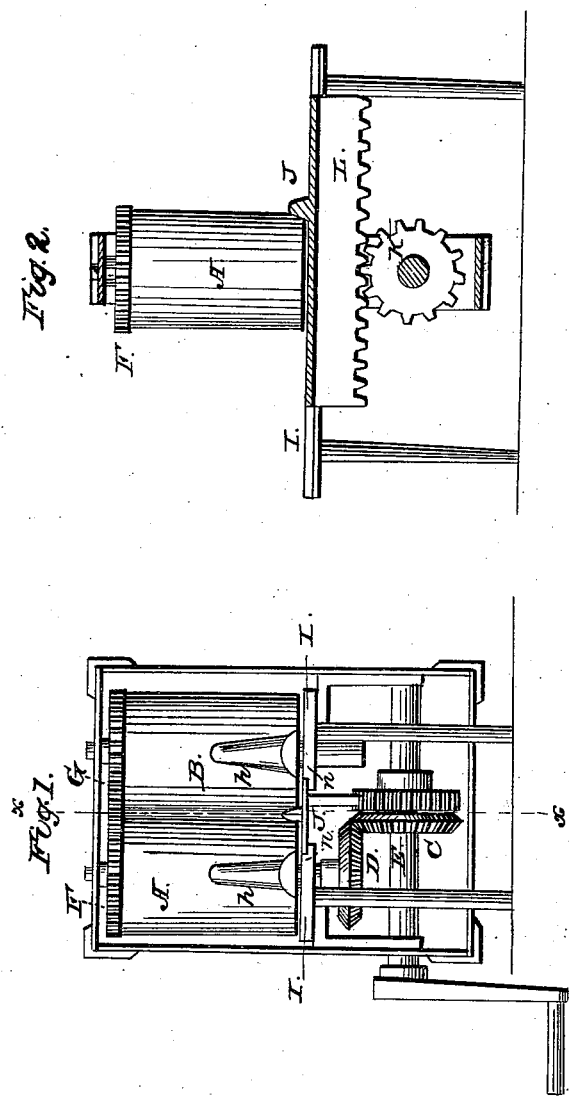

JOHN GARDNER, OF PHILADELPHIA, PENNSYLVANIA.

Letters Patent No. 85,083, dated December 22, 1868.

IMPROVED MACHINE FOR MAKING CONFECTIONERY.

The Schedule referred to in these Letters Patent and making part of the same.

*To all whom it may concern:*

Be it known that I, JOHN GARDNER, of Philadelphia, in the county of Philadelphia, and State of Pennsylvania, have invented a new and useful Improvement in Making Confectionery; and I do hereby declare that the following is a full, clear, and exact description thereof, which will enable others skilled in the art to make and use the same, reference being had to the accompanying drawings, forming part of this specification.

This invention relates to a new and useful improvement in the manufacture of ornamental confectionery, whereby the same is greatly improved; and It consists in forming the confectionery in various shapes and figures, between upright rolls or cylinders, so that the pieces of confectionery will, when they leave the rolls, stand upright on a firm base, and be carried off in that position by movable plates, or revolving belts, or other device, as will be hereinafter described.

Figure 1 represents a front elevation of the machine, by which I carry out my invention.

Figure 2 is a vertical transverse section of the same.

Similar letters of reference indicate corresponding parts.

A B represent two vertical cylinders or rolls, which are revolved by bevel-gears C D on the shaft E, and spur-wheels F G on the top of the cylinders, as seen in the drawing.

The form of the article or figure to be made is cut in the rolls, one-half (or any other part) in each roll, as seen at $h\ h$, and the rolls are so arranged that when they revolve, the two cavities $h\ h$ will correspond, and enclose the material and form the figure.

The rolls and gearing are confined in a suitably-constructed frame, which is kept upright by legs or supports attached to the horizontal plates I I, as more distinctly seen in fig. 2.

Between these two plates I I, there is a movable plate, J, which is worked back and forth by the pinion $k$, on the shaft E, and the rack L, on the under side of the plate J. The same motion that actuates the rolls causes this plate to slide on ways made by rebating the inner edges of the plates I I, as seen at $n\ n$, fig. 1.

A revolving belt, or any other device, may be used for carrying off the confectionery as it is formed.

It will be seen that as the pieces or figures of confectionery are formed, they leave the rollers in an upright position, and are carried off in that position without being in any manner mutilated or injured, so that the forms of the figures made are preserved in a perfect state.

This arrangement and method of forming figures or pieces in confectionery applies to hollow as well as solid figures.

For making hollow figures, the prints may be fast on the movable plate J, as seen at $o$ in the drawing.

Having thus described my invention,

I claim as new, and desire to secure by Letters Patent—

1. The forming of figures (either solid or hollow) in confectionery, by revolving rollers or cylinders, in an upright position, so that the figures formed by the revolution of the rollers or cylinders will stand in an upright position, substantially as and for the purposes described.

2. The movable plate J, or its equivalent, in combination with the rollers A B for carrying off or removing from the rollers the figures thus formed, in an upright position, substantially as described.

The above specification signed by me, this 12th day of November, 1868.

JOHN GARDNER.

Witnesses:
  EDWARD WILLIAMS,
  AUGUSTUS LENSICH.